United States Patent
Miyasaka et al.

(10) Patent No.: US 12,465,430 B2
(45) Date of Patent: Nov. 11, 2025

(54) MAGNETIC FIELD BASED TRACKING METHODS AND SYSTEMS

(71) Applicant: Nanyang Technological University, Singapore (SG)

(72) Inventors: Muneaki Miyasaka, Singapore (SG); Soo Jay Louis Phee, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 87 days.

(21) Appl. No.: 18/248,724

(22) PCT Filed: Oct. 19, 2021

(86) PCT No.: PCT/SG2021/050630
§ 371 (c)(1),
(2) Date: Apr. 12, 2023

(87) PCT Pub. No.: WO2022/098296
PCT Pub. Date: May 12, 2022

(65) Prior Publication Data
US 2023/0404681 A1    Dec. 21, 2023

(30) Foreign Application Priority Data
Nov. 4, 2020   (SG) ............... 10202010982R

(51) Int. Cl.
| A61B 34/20 | (2016.01) |
| A61B 90/00 | (2016.01) |
| A61F 5/00 | (2006.01) |

(52) U.S. Cl.
CPC ............ *A61B 34/20* (2016.02); *A61F 5/003* (2013.01); *A61F 5/0046* (2013.01);
(Continued)

(58) Field of Classification Search
CPC ............ A61B 34/20; A61B 2034/2051; A61B 2090/3958; A61B 2503/40;
(Continued)

(56) References Cited

U.S. PATENT DOCUMENTS

| 5,425,382 A | 6/1995 | Golden et al. |
| 10,470,909 B2 | 11/2019 | Phee et al. |

(Continued)

FOREIGN PATENT DOCUMENTS

| WO | 9849938 A1 | 11/1998 |
| WO | 2013/000845 A1 | 1/2013 |
| WO | 2015085011 A1 | 6/2015 |

OTHER PUBLICATIONS

Search Report and Written Opinion dated Jan. 28, 2022 for related PCT Application No. PCT/SG2021/050630, 10 pages.
(Continued)

*Primary Examiner* — Christopher Koharski
*Assistant Examiner* — Renee C Langhals
(74) *Attorney, Agent, or Firm* — Hovey Williams LLP; Kameron D. Kelly

(57) ABSTRACT

A magnetic sensor-based tracking system, a method, and computer readable media for tracking an apparatus having a magnetic field generating device through an environment having a consistent magnetic field are provided. The magnetic sensor-based tracking system includes the apparatus having the magnetic field generating device, one or more magnetic field sensing devices, and a controller. Each of the one or more magnetic field sensing devices is configured in operation to be located within a sensible range of an expected path of the magnetic field generating device as it passes through the environment, the expected path including a plurality of regions. The controller is coupled to the one or more magnetic field sensing devices and configured in
(Continued)

operation to utilize magnetic field sensing of the one or more magnetic field sensing devices to track the apparatus within the environment by obtaining at least one magnetic field reading from at least one of the one or more magnetic sensing devices and computing a position and an orientation of the apparatus within the environment based on at least one solution set obtained from a pre-obtained magnetic field model.

18 Claims, 10 Drawing Sheets

(52) U.S. Cl.
CPC ............... *A61B 2034/2051* (2016.02); *A61B 2090/3958* (2016.02); *A61B 2503/40* (2013.01)

(58) Field of Classification Search
CPC .......... A61B 2017/00876; A61B 5/062; A61B 5/6861; A61B 5/687; A61B 34/73; A61B 2090/3954; A61F 5/003; A61F 5/0046; A61F 5/0076
See application file for complete search history.

(56) References Cited

U.S. PATENT DOCUMENTS

| | | | |
|---|---|---|---|
| 2013/0217999 A1 | 8/2013 | Burnside et al. | |
| 2015/0051589 A1* | 2/2015 | Sako | A61B 1/00148 604/891.1 |
| 2017/0181661 A1* | 6/2017 | Chiba | A61B 1/00158 |
| 2019/0365277 A1* | 12/2019 | Brister | A61F 5/004 |

OTHER PUBLICATIONS

European Search Report dated Sep. 11, 2024 for related European Patent Application No. 21889724.7, 19 pages.

Sun Zhenglong et al., A Non-invasive Real-time Localization System for Enhanced Efficacy in Nasogastric Intubation, Annals of Biomedical Engineering, vol. 43, No. 12, Jun. 25, 2015, pp. 2941-2952, XP093198191, New York.

Sun Zhenglong et al., Design and analysis of a compliant non-invasive real-time localization system for nasogastric intubation, 2014 IEEE/ASME International Conference on Advanced Intelligent Mechatronics, IEEE, Jul. 8, 2014, pp. 1091-1096, XP032628583.

Kaan Hung Leng et al., First-in-man feasibility study of a novel ingestible magnetically inflated balloon capsule for treatment of obesity, Endoscopy International Open, vol. 08, No. 05, Apr. 17, 2020, pp. E607-E610, XP093198213, DE.

Sun Zhenglong et al., Using heterogeneous sensory measurements in a compliant magnetic localization system for medical intervention, 2015 IEEE International Conference on Advanced Intelligent Mechatronics (AIM), Jul. 7, 2015, pp. 133-138, XP033210490.

Do Thanh Nho et al., Development and Testing of Magnetically Actuated Capsule Endoscopy for Obesity Treatment, PLOS One, vol. 11, No. 1, Jan. 27, 2016, pp. 1-23, XP093199773.

* cited by examiner

MAGNETIC FIELD BASED TRACKING METHODS AND SYSTEMS

RELATED APPLICATIONS

This application claims priority to PCT International Patent Application No. PCT/SG2021/050630, filed Oct. 19, 2021, which claims the priority benefit of Singaporean Patent Application No. 10202010982R, filed Nov. 4, 2020. Each of these applications are hereby incorporated by reference in their entireties.

TECHNICAL FIELD

The present invention generally relates to magnetic field tracking, and more particularly relates to methods and systems for magnetic field tracking of an object whose magnetic field is consistent and known.

BACKGROUND OF THE DISCLOSURE

Intragastric balloon (IGB) is one of the methods for the treatment of obesity. The Magnetically Inflated Balloon Capsule (MIBC) is a type of IGB whose balloon inflation is triggered by the interaction between an embedded permanent magnet and an external permanent magnet. One problem with the MIBC is that it could cause damage if the inflation is triggered while the MIBC is inside the esophagus. If information could be provided that there is no MIBC inside the esophagus, the MIBC could be inflated safely. Yet, there is no method or system for tracking a swallowable IGB in vivo.

Various related methods, however, can be found in the study of endoscopic capsule tracking. Electromagnetic, magnetic, video, reflected marker, ultrasound, x-ray, and gamma-ray based localizations present viable solutions for endoscopic capsule tracking. While it is preferred to have no additional components in the capsule due to the size limitation, magnetic localization utilizing an embedded permanent magnet is a suitable method.

Typical magnetic field-based tracking involves either solving an inverse magnet model or optimization with a forward magnet model. However, optimization is often used due to the difficulty of taking the inverse of a magnet model. Challenges associated with optimization include the requirement of the number of sensors and the computational intensity. Because the tracking accuracy relies on the number of sensors employed, many sensors are often needed. Also, optimization with many sensors requires high computational effort and results in low tracking frequency.

Thus, there is a need for magnetic field-based tracking methods and systems which overcome the drawbacks of the prior art and which are simpler and more cost-effective and which can provide a large tracking range and a fast computational speed suitable for IGB tracking in vivo. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a magnetic sensor-based tracking system for tracking an apparatus through an environment having a consistent magnetic field is provided. The magnetic sensor-based tracking system includes the apparatus having a magnetic field generating device, one or more magnetic field sensing devices, and a controller. Each of the one or more magnetic field sensing devices is configured in operation to be located within a sensible range of an expected path of the magnetic field generating device as it passes through the environment, the expected path including a plurality of regions. The controller is coupled to the one or more magnetic field sensing devices and configured in operation to utilize magnetic field sensing of the one or more magnetic field sensing devices to track the apparatus within the environment by obtaining at least one magnetic field reading from at least one of the one or more magnetic sensing devices and computing a position and an orientation of the apparatus within the environment based on at least one solution set obtained from a pre-obtained magnetic field model.

According to another aspect of the present embodiments, a method for tracking a magnetic object is provided. The method includes obtaining a magnetic field reading from a first magnetic field sensor and searching the magnetic field reading in an instantaneous search range of a pre-obtained magnetic field model to obtain solution sets that are within a search threshold. The method further includes computing a position and an orientation of the magnetic object based on the solution sets and updating the search threshold and the instantaneous search range for subsequent searches based on one or both of a required usage of the method for tracking or an environment through which the magnetic object is tracked.

According to a further aspect of the present embodiments, computer readable media for tracking a magnetic object utilizing magnetic field sensing of one or more magnetic field sensing devices is provided. The computer readable media stores instructions for a processing means to obtain a magnetic field reading from each of the one or more magnetic field sensing devices and search the magnetic field readings in an instantaneous search range of a pre-obtained magnetic field model to obtain solution sets that are within a search threshold. The computer readable media also stores instructions for the processing means to compute a position and an orientation of the magnetic object based on the solution sets and update the search threshold and the instantaneous search range for subsequent searches based on one or both of a required usage of the method for tracking or an environment through which the magnetic object is tracked.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 3, comprising FIGS. 3A, 3B and 3C, depicts photographs of elements in the exemplary system of FIG. 2 in accordance with the present embodiments, wherein FIG. 3A depicts an exemplary permanent magnet for embedding in the magnetically inflated intragastric balloon capsule, FIG.

3B depicts an exemplary sensor, and FIG. 3C depicts an Arduino UNO and an exemplary sensor shield.

FIG. 4, comprising FIGS. 4A and 4B, depicts illustrations of esophageal search regions in accordance with the present embodiments, wherein FIG. 4A depicts a side view showing instantaneous and global search ranges and FIG. 4B depicts a 3D view showing instantaneous and global search ranges.

FIG. 8, comprising FIGS. 8A and 8B, depicts graphs of a robot trajectory obtained by the experimental setup of FIG. 7 in accordance with the present embodiments, wherein FIG. 8A depicts a graph of the obtained trajectory in a side x-z plane and FIG. 8B depicts a graph of the obtained trajectory in a front y-z plane.

And FIG. 10, comprising FIGS. 10A to 10F, depicts graphs of raw estimation results and averages of five estimation results for the Cartesian coordinates and their position error in accordance with the present embodiments, wherein FIG. 10A depicts a graph of raw estimation results and averages of last five estimations for the z-axis, FIG. 10B depicts a graph of position error for the raw estimation results and averages of last five estimations for the z-axis, FIG. 10C depicts a graph of raw estimation results and averages of last five estimations for the x-axis, FIG. 10D depicts a graph of position error for the raw estimation results and averages of last five estimations for the x-axis, FIG. 10E depicts a graph of raw estimation results and averages of last five estimations for the y-axis, and FIG. 10F depicts a graph of position error for the raw estimation results and averages of last five estimations for the y-axis.

Figure 1:
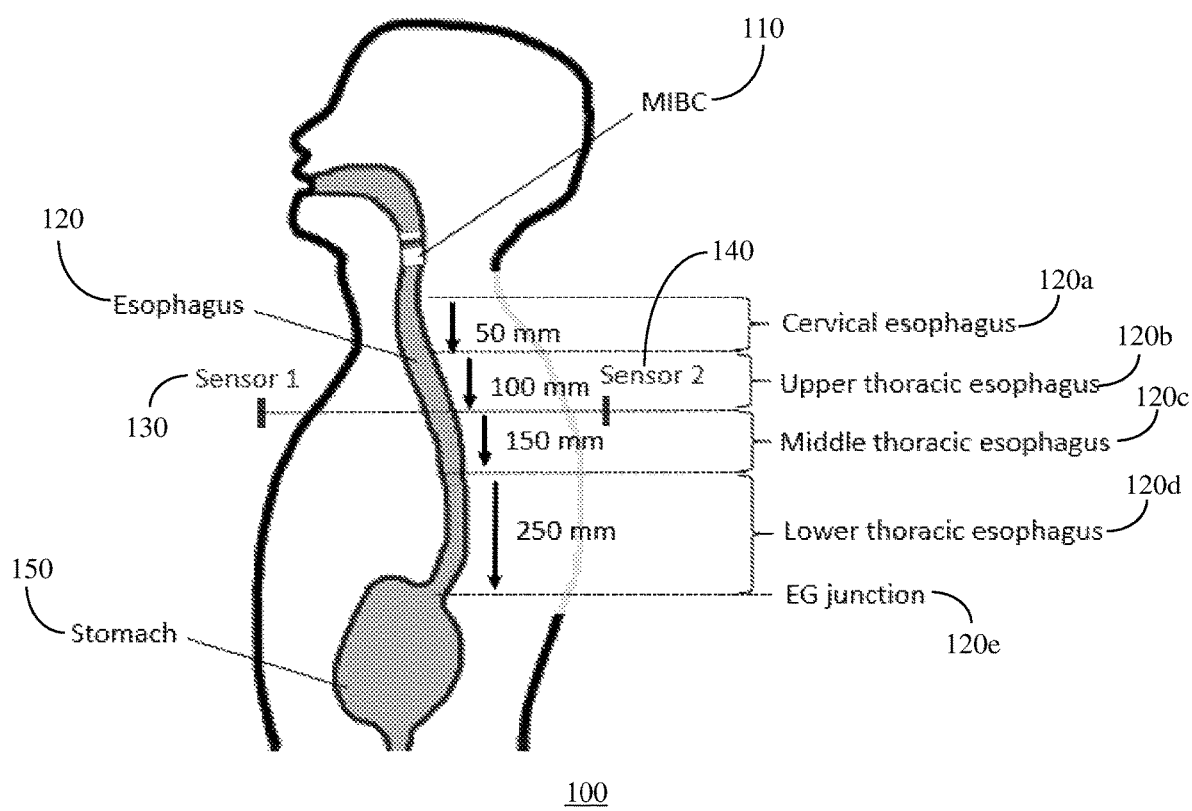
FIG. 1 depicts an illustration of a sensor arrangement of magnetic sensor-based tracking methods and systems in accordance with present embodiments vis-à-vis an esophagus of an average adult.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present methods and systems to track a position of a magnetically inflated balloon capsule (MIBC) while it is passing through the esophagus until it is confirmed there is no MIBC inside the esophagus. In addition, with present embodiments, practical and cost-effective methods and systems for magnetic localization are presented, including utilizing a permanent magnet embedded in a MIBC for MIBC tracking.

While conventional magnetic field-based tracking involves either solving an inverse magnet model or optimization with a forward magnet model, the magnetic field-based tracking methods and systems in accordance with the present embodiments involve neither solving the inverse model nor optimization. Instead, the methods and systems in accordance with the present embodiments rely on searching sensor readings through an array of a pre-obtained magnetic fields. These methods and systems provide a large tracking range and a fast computational speed as compared to conventional methods and systems which rely on computationally intensive optimization requiring high performance computers and numerous sensors to solve the inverse magnet model or optimize the forward magnet model. In addition, as fewer sensors are required, the systems in accordance with the present embodiments are simpler and more cost-effective thereby presenting low cost and portable systems which can be widely adopted for clinical and point-of-care use.

The systems embodying tracking methods in accordance with the present embodiments include one or more magnetic sensors and a tracking object whose magnetic field is consistent and known. These tracking methods advantageously enable simple and low-cost systems wherein the tracking target is compact, energy-efficient, and safe as it can include a permanent magnet that does not require any power source or wiring to send power. In addition, since the magnetic field is consistent across a non-ferromagnetic medium such as air, water, and the human body, the method can be used for various applications in a multitude of environments.

An embodiment discussed hereinafter presents a method for in vivo tracking a magnetically inflated intragastric balloon capsule (i.e., a MIBC) with a permanent magnet embedded inside using only two magnetic sensors. Those skilled in the art will realize that the systems and methods described hereinafter can be used for other magnetic field-based tracking applications such as tracking a movement of a permanent magnet device in a moving fluid (e.g., through fluid moving through piping in industrial applications) and other biological and non-biological environments. Those skilled in the art will also realize that the present embodiments are not limited to two sensors (e.g., one or more sensors can be utilized in accordance with the present embodiments), and that, while a permanent magnet can provide cost and size efficiencies, the magnet is not limited to a permanent magnet and can, for example, be enabled by an electromagnet.

An MIBC is swallowed and is designed to be inflated inside the stomach by approaching a permanent magnet located external to the body and near the abdomen. If the balloon inflation is accidentally triggered while the MIBC is still in the esophagus, the esophagus will be damaged. Therefore, to safely inflate the MIBC, the magnetic field-based tracking methods and systems in accordance with the present embodiments track the MIBC's position along the esophagus to confirm when the MIBC passes through the esophagus. To overcome the drawbacks of conventional magnetic sensor-based tracking systems which tend to be bulky and costly since they involve computationally intensive optimization with many magnetic sensors, an algorithm has been developed for the methods and systems in accordance with the present embodiments that estimates the position of the permanent magnet inside the MIBC by using a grid search combined with a dynamically confined search range and search threshold modulation.

To confirm whether the MIBC passes through and out of the esophagus, it was determined that only the position along the direction of the swallow (i.e., along the z-axis) is required. Therefore, the algorithm in accordance with the present embodiments focuses on one-dimensional tracking along the z-axis, and advantageously achieved an average one-dimensional position error of 3.48 mm as compared to the up to 4 mm average error for the conventional magnetic sensor-based tracking systems.

Referring to FIG. 1, an illustration 100 depicts an MIBC 110 about to enter an esophagus 120 and two sensors 130, 140 of the magnetic field-based tracking systems and methods in accordance with the present embodiments. The system in accordance with the present embodiments utilizes two 3-axis magnetic sensors 130, 140 to track a centroid position of a magnet which magnetic field at all the possible positions and orientations within a search volume is known. The MIBC 110 is shown before it enters an esophagus 120 of an average adult where the esophagus dimensions for an average adult are 50 mm for the cervical esophagus 120a, 100 mm for the upper thoracic esophagus 120b, 150 mm for the middle thoracic esophagus 120c, and 250 mm for the lower thoracic esophagus 120d. After passing through the esophagus 120 and through the esophagogastric (EG) junction 120e, the MIBC 110 is to be inflated in the stomach 150.

Each combination of x, y, and z components of a magnet's field is associated with certain combinations of the magnet's positions and orientations. Therefore, the position and orientation of the magnet in the MIBC 110 is estimated by searching and finding magnetic field values obtained by the sensors 130, 140 from within a table of pre-calculated magnetic field values. In accordance with the systems and methods of the present embodiments, the sensors 130, 140 are placed in front and back of the patient.

When the sensors are positioned in between the upper thoracic esophagus 120b and the middle thoracic esophagus 120c or the upper pulmonary rib cage, tracking of the entire esophagus 120 can be achieved by covering at least 100 mm above and 150 mm below a level of the sensors 130, 140. Considering a typical body thickness around the upper pulmonary rib cage, it is necessary to place the sensors at least 200 mm apart.

Figure 2:
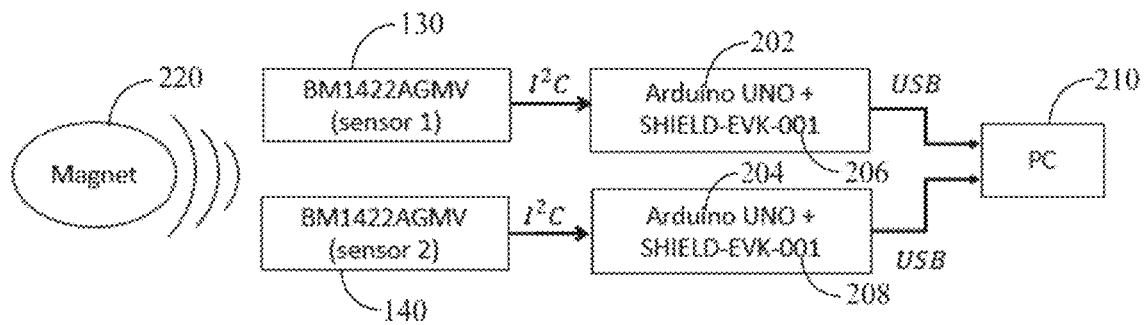
FIG. 2 depicts a block diagram of an exemplary magnetic sensor-based tracking system in accordance with the present embodiments.
Figure 3A:
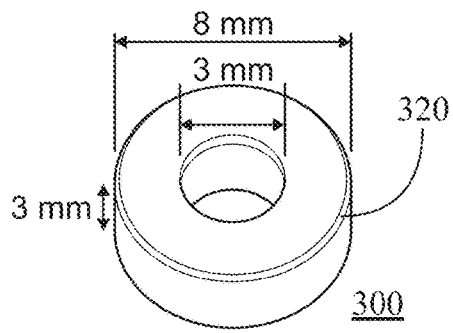
Figure 3B:
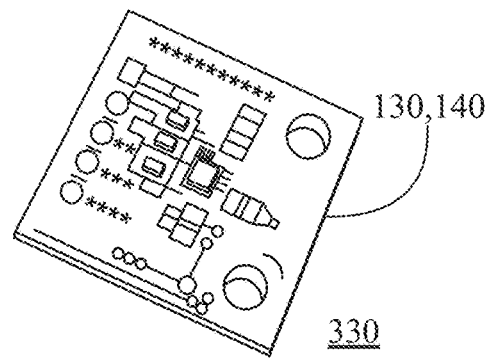
Figure 3C:
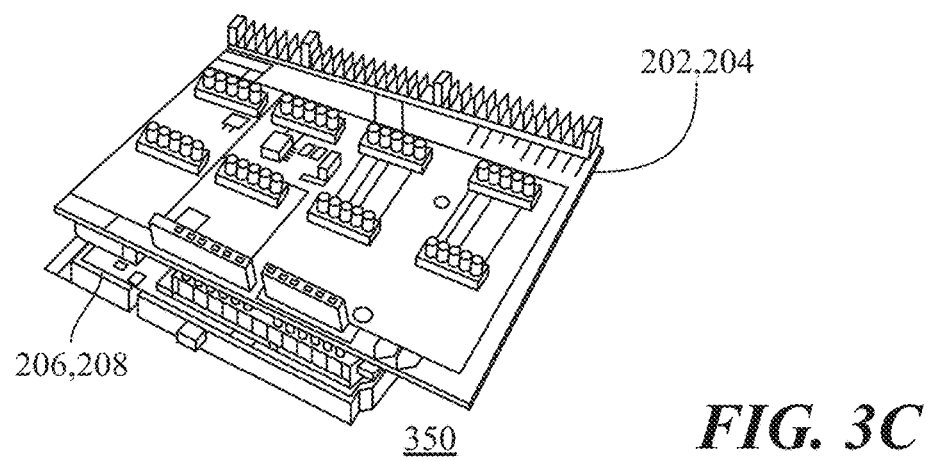

A block diagram 200 of an exemplary system setup in accordance with the present embodiments is illustrated in FIG. 2. The sensors 130, 140 are BM1422AGMV three-axis magnetic sensors from Rohm Semiconductor of Japan and have 0.042 µT sensitivity. The sampling frequency is set as 100 Hz and each sensor 130, 140 is connected to respective Arduino UNO boards 202, 204 from Arduino of Italy) via SHIELD-EVK-001 sensor shields 206, 208 from Rohm Semiconductor. The sensor data is transferred from the Arduino UNOs 202, 204 to a laptop PC 210 with an Intel i7-7500U 2.7 GHz CPU through USB serial ports. The MIBC targeted in the exemplary system has a grade N40 neodymium axially magnetized ring magnet 220 from Misumi Group Inc. of Japan having an 8 mm outer diameter, a 3 mm inner diameter, and a 3 mm thickness. Referring to FIGS. 3A, 3B and 3C, photographs 300, 330, 350 depict the various components of the exemplary system where the photograph 300 depicts the permanent magnet 220, the photograph 330 depicts the sensors 130, 140, and the photograph 350 depicts the combination of the Arduino UNO boards 202, 204 and the sensor shields 206, 208

Since there are no other magnetic materials in the MIBC other than the permanent magnet 220, the emitted magnetic field is consistent and it can be utilized for tracking. To create a table of the magnetic field of the permanent magnet 220, the Radia electromagnetic analysis software package created by the European Synchrotron Radiation Facility interfaced with Mathematica was used. The Radia calculates the magnetic field with a boundary integration method and analytical expressions which provide more accurate data than a simple analytical model and faster computation than a finite element method (FEM). Although more accurate tracking can be achieved with more accurate methods including the FEM, the Radia is used in in systems and methods in accordance with the present embodiments because the generated data is reasonably accurate and the time to create a large table of the magnetic field is reduced. The Radia generated magnetic field data is accurate enough to achieve real-time physical simulations for an electrical magnet based haptic device and control of a magnetic levitation device.

The initial step of the tracking algorithm in accordance with the present embodiments is to apply constant offsets to the sensor readings and remove the effect of the constant background magnetic field. At each computational iteration, the sensor obtained magnetic field vector is searched through a table of the pre-calculated magnetic field using a grid search. This search is performed for each sensor separately. All the found sets of the MIBC's positions and orientations are stored in $P_j$. The subscript j (which can equal 1 or 2) is used to represent sensor 1 130 and sensor 2 140, respectively. The proposed tracking method can be expressed as follows:

Find all sets $$P_j = [x \in R_x, y \in R_y, z \in R_z, \theta_p \in R_p, \theta_r \in R_r]$$

such that $$|B_{model}(x,y,z,\theta_p,\theta_r) - B_{sensor_j}| B_{thresh_j} \quad (1)$$

where x, y, and z indicate the Cartesian coordinates and $\theta_p$ and $\theta_r$ indicate the pitch and roll angles of the target magnet. Since the magnet has a ring shape, the six-dimensional positions and orientations can be represented with those five variables. The Cartesian coordinate system is selected over other coordinate systems to set the search grid evenly throughout the search space and to facilitate the alignment of the search grid for the sensors 130, 140 for later computations. Although the z position is the main interest, all other positions and rotations are needed for the localization. $R_x$, $R_y$, $R_z$, $R_p$, and $R_r$ are the search ranges for x, y, z, $\theta_p$, and $\theta_r$, respectively. $B_{model}(x, y, z, \theta_p, \theta_r)$ is the model calculated magnetic field vector inside the search range, $B_{sensor_j}$ is the magnetic field vector sensed by the three-axis magnetic sensors 130, 140, and $B_{thresh_j}$ is the threshold magnetic field vector for acceptable error between the model and the sensors 130, 140. All the magnetic field vectors have x, y, and z components:

$$B_{model}(x, y, z, \theta_p, \theta_r) = \begin{bmatrix} B_{model,x}(x, y, z, \theta_p, \theta_r) \\ B_{model,y}(x, y, z, \theta_p, \theta_r) \\ B_{model,z}(x, y, z, \theta_p, \theta_r) \end{bmatrix} \quad (2)$$

$$B_{sensor_j} = \begin{bmatrix} B_{sensor_{j,x}} \\ B_{sensor_{j,y}} \\ B_{sensor_{j,z}} \end{bmatrix},$$

$$B_{thresh_j} = \begin{bmatrix} B_{thresh_{j,x}} \\ B_{thresh_{j,y}} \\ B_{thresh_{j,z}} \end{bmatrix}$$

Then, the overlapped sets of $P_1$ and $P_2$ are extracted:

$$P_{overlap} = P_1 \cap P_2 \quad (3)$$

A set of $P_1$ and $P_2$ is judged to be overlapped if the difference of all the components is within a threshold $P_{thresh}$ with considering the sensor misalignment and estimation error. The overlapped sets $P_{overlap}$ can be written as:

$$P_{overlap} = \begin{bmatrix} \hat{x}_1 & \hat{y}_1 & \hat{z}_1 & \hat{\theta}_{p,1} & \hat{\theta}_{r,1} \\ \hat{x}_2 & \hat{y}_2 & \hat{z}_2 & \hat{\theta}_{p,2} & \hat{\theta}_{r,2} \\ \vdots & \vdots & \vdots & \vdots & \vdots \\ \hat{x}_N & \hat{y}_N & \hat{z}_N & \hat{\theta}_{p,N} & \hat{\theta}_{r,N} \end{bmatrix} \quad (4)$$

where N is the detected number of overlapped sets. For each component, the average of all the overlapped sets is calculated as the final estimation result:

$$x_{est} = \frac{\sum_{i=1}^{N} \hat{x}_i}{N}, \ y_{est} = \frac{\sum_{i=1}^{N} \hat{y}_i}{N}, \ z_{est} = \frac{\sum_{i=1}^{N} \hat{z}_i}{N}, \quad (5)$$

$$\theta_{p,est} = \frac{\sum_{i=1}^{N} \hat{\theta}_{p,i}}{N}, \ \theta_{r,est} = \frac{\sum_{i=1}^{N} \hat{\theta}_{r,i}}{N}$$

Figure 4A:
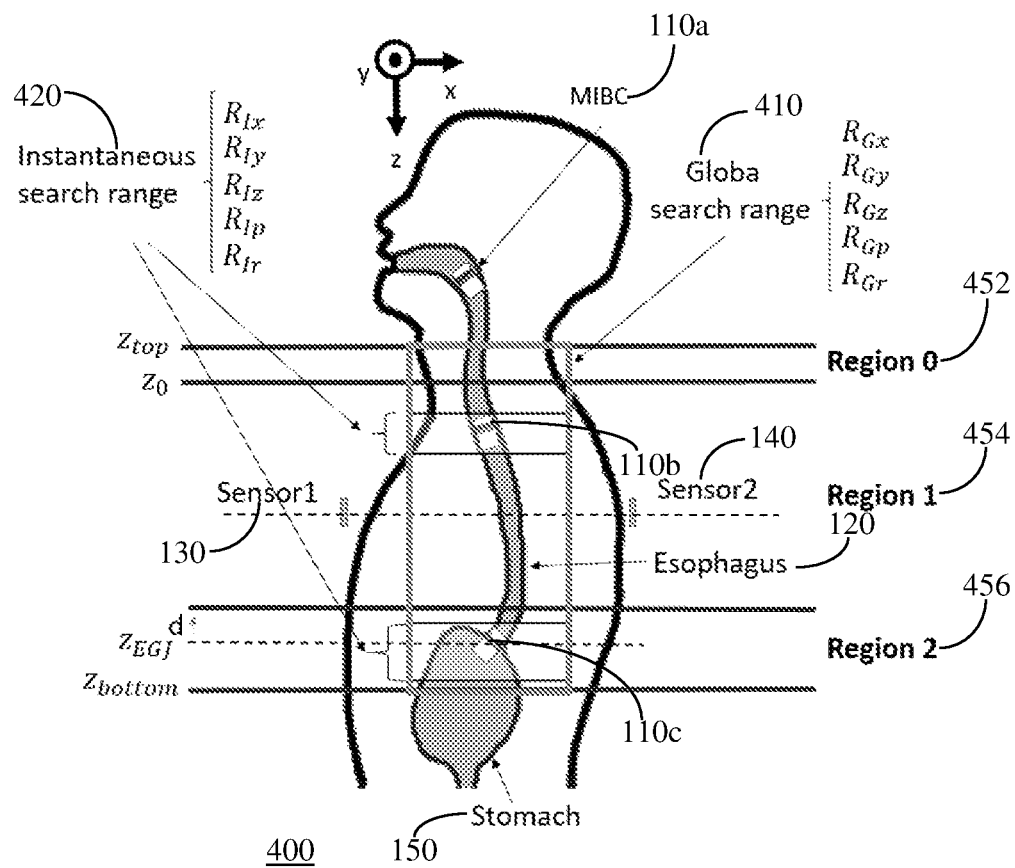
Figure 4B:
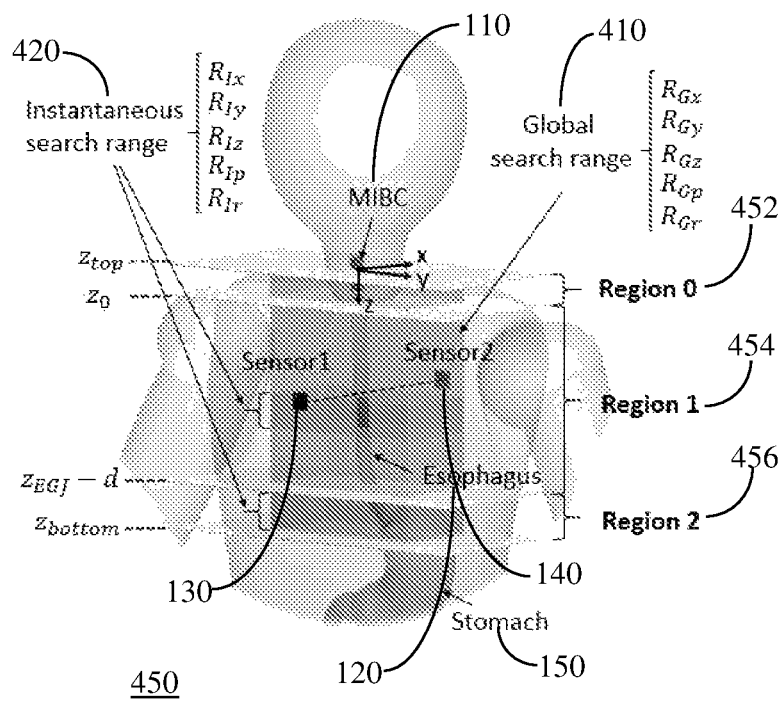

Referring to FIGS. 4A and 4B, a side view illustration 400 and a rear view 450 depict the MIBC at a first position 110*a* and a second position 110*b* within the esophagus 120 and at a third position 110*c* entering the stomach 150. If the entire interested search ranges or the global search ranges 410 covering the whole of the esophagus from the cervical esophagus 120*a* (FIG. 1) to through to the stomach 150 (denoted as $R_{Gx}$, $R_{Gy}$, $R_{Gz}$, $R_{Gp}$, and $R_{Gr}$ for x, y, z translations and pitch, roll rotations, respectively) are used for the search ranges in Equation (1) above, the algorithm becomes computationally intensive and may fail to achieve real-time tracking. In addition, the localization could become inaccurate since the possible solutions could potentially spread over the entire search space. To avoid those issues, instantaneous search ranges 420 (denoted as $R_{Ix}$, $R_{Iy}$, $R_{Iz}$, $R_{Ip}$, and $R_{Ir}$) are introduced in accordance with the present embodiments. First, $R_{Gz}$ is subdivided into three regions as seen in the illustration 450: Region 0 452, Region 1 454, and Region 2 456. Each region is assigned a specific $R_{Iz}$ and $R_{Ip}$ at each computational iteration k. For all the other regions, the global search range 410 is used as the instantaneous search range 420 (i.e., $R_{Ix}=R_{Gx}$, $R_{Iy}=R_{Gy}$, and $R_{Ir}=R_{Gr}$).

Detailed explanations of each region are provided hereinafter.

Region 0 452 (FIG. 4B) is only used for identifying a first estimation. For the z position, since the MIBC always enters from a top of the search volume as swallowed, only a region near the top of the global search range 410 is of interest. The z position of the MIBC is bounded as the speed of swallow is limited. Also, the orientation or pitch angle of the MIBC can be limited due to the geometry of the esophagus. Accordingly, the instantaneous search ranges $R_{Iz}$ and $R_{Ip}$ are written as:

$$R_{Iz}=[z_{top}, z_{top}+v_{max}\Delta t] \in [z_{top}, z_0]$$

$$R_{Ip}=[0, \theta_{p,max}] \quad (6)$$

where $z_{top}$ is a highest end of the z search range, $v_{max}$ is a maximum speed of a swallow, $z_0$ is the first estimated z position, $\theta_{p,max}$ is a maximum tilt angle of the esophagus, and $\Delta t$ is a time step between the iterations.

Region 1 454 (FIG. 4B) is a region starting from a first position of the MIBC estimated by the algorithm in accordance with the present embodiments and covers up to the esophagogastric (EG) junction 120*e* (FIG. 1). In our method, the z location of the EG junction ($z_{EGJ}$) is subject to be determined without any image guidance. Therefore, it could slightly be off from the true position. Accordingly, the Region 1 454 ends at some distance d above where the EG junction 120*e* is assumed to be to ensure the Region 1 454 only contains the esophagus. The possible instantaneous search ranges 420 for a next estimation are calculated from a current position and orientation and a maximum possible translation and rotation in one computational iteration. The calculated instantaneous search ranges 420 are compared against the maximum translation and rotation inside the esophagus to avoid exceeding their limits. The instantaneous search ranges 420 in Region 1 454 are as follows:

$$R_{Iz}[z_k-z_{unc}, z_k+v_{max}\Delta t+z_{unc}] \in [z_0, z_{EGJ}-d]$$

$$R_{Ip}=[\theta_{p,k}-\phi R_1-\theta_{p,unc}, \theta_{p,k}+\phi_{R1}+\theta_{p,unc}] \in [0, \theta_{p,max}] \quad (7)$$

where $z_k$ and $\theta_{p,k}$ are $\theta_{p,est}$ and $\theta_{p,est}$ at the kth iteration. $z_{unc}$ and $\theta_{p,unc}$ are the uncertainties due to the estimation errors, and $\phi_{R1}$ is the constant that indicates the possible pitch rotation angle during one computational iteration inside the esophagus.

Region 2 456 starts from the end of Region 1 454 which is d above the position where the EG junction 120*e* is estimated to be. However, depending on the esophagus dimension of individuals, the MIBC could potentially be inside the stomach (beyond the EG junction 120*e*). Hence, the orientation of the MIBC could be any orientation and a wider pitch search range is required. For z translation, the MIBC can be accelerated due to gravity assuming the patient's body is straight up. Thus, the instantaneous search ranges 420 become:

$$R_{Iz}=[z_k-z_{unc}, z_k+\dot{z}_k\Delta t+\tfrac{1}{2}g\Delta t^2+z_{unc}] \in [z_{EGJ}-d, z_{bottom}]$$

$$R_{Ip}=[\theta_{p,k}-\phi_{R2}-\theta_{p,unc}, \theta_{p,k}+\phi_{R2}+\theta_{p,unc}] \in [0, \pi] \quad (8)$$

where $\dot{z}_k$ is the time derivative of $z_k$, g is the gravitational constant, $z_{bottom}$ is the lowest end of the z search range, and $\phi_{R2}$ is the constant that indicates the possible pitch rotation angle during one computational iteration inside the stomach.

One important parameter that affects localization performance is the search threshold $B_{thresh_j}$. At each localization iteration, each sensor 130, 140 will find a certain number or $n_j$ sets of solutions from Equation (1). It has been found that $n_j$ becomes too small or too large when $B_{thresh_j}$ is constant. When $n_j$ is too small, there is a possibility that no overlap is found and the tracking could fail. On the other hand, when $n_j$ is too large, real-time tracking will fail due to intensive computation. Additionally, it is empirically found there is a trend that $n_j$ varies depending on the z position of the magnet 220 (FIG. 2) in the MIBC 110. Moreover, since the difference between $B_{model}$ and $B_{sensor_j}$ increases as the magnitude of the sensed magnetic field is larger, $B_{thresh_j}$ needs to be adjusted based on $B_{sensor_j}$ as well. To accommodate all the findings, $B_{thresh_j, k+1}$ ($B_{thresh_j}$ at a k+1th iteration) is controlled so that the right amount of solution sets is detected using the following proportional derivative controller type search threshold modulator:

$$B_{thresh_j, k+1} = B_{thresh_j, k} + K_{pj,k}(z)e_{j,k} + K_{d_j,k} \frac{de_{j,k}}{dt} \quad (9)$$

$$K_{p_j,k}(z) = \alpha(z)|B_{sensor_j,k}|$$

$$K_{d_j,k}(z) = \beta|B_{sensor_j,k}|$$

$$e_{j,k} = n_{target} - n_{j,k}$$

$$\frac{de_{j,k}}{dt} = \frac{e_{j,k} - e_{j,k-1}}{t_k - t_{k-1}}$$

where $B_{thresh_j,k}$ is $B_{thresh_j}$ at the kth iteration; $K_{p_j,k}(Z)$ is the proportional gain vector which is a function of the height z and $K_{d_j,k}$ is the derivative gain vector at the kth iteration; $\alpha(z)$ is the z position-dependent modulation coefficient for the proportional gain and $\beta$ is the modulation coefficient for the derivative gain; $e_{j,k}$ is the error between the number of the targeted sets $n_{target}$ and the detected sets at the kth iteration $n_{j,k}$;

$$\frac{de_{j,k}}{dt}$$

is a time derivative of $e_{j,k}$; and $t_k$ and $t_{k-1}$ are the time at the kth and k−1th iteration, respectively.

Figure 5:
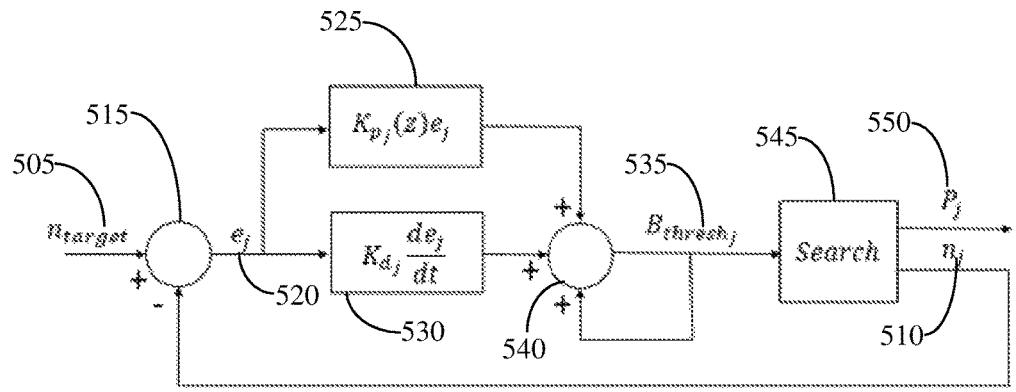
FIG. 5 depicts a circuit diagram of a proportional derivative controller search threshold modulator in accordance with present embodiments.

Referring to FIG. 5, a circuit diagram 500 depicts the proportional derivative controller type search threshold modulator where $K_{p_j}$ (z) and $K_{d_j}$ are the proportional and derivative gain vectors without the iteration subscript, respectively. First, the difference between $n_{target}$ 505 and $n_j$ 510 is calculated 515. The difference ($e_j$) 520 is subsequently used to compute the proportional term 525 and the derivative term 530 of $B_{thresh_j}$ 535. Then, those two terms 525, 530 and $B_{thresh_j}$ 535 are summed 540 to obtain $B_{thresh_j}$ at the next iteration which is used for the search algorithm 545 to obtain $P_j$ 550 and $n_j$ 510.

The overlap threshold $P_{thresh}$ also plays an important role in the localization process. Due to a sensor axis misalignment and localization error, it is possible to detect no overlap even if $P_1$ and $P_2$ include virtually identical solution sets. To avoid such an issue, the threshold $P_{thresh}$ is introduced and the sets are considered overlapped if the difference of all the components is within the threshold. $P_{thresh}$ has five components for x, y, and z positions and pitch and roll orientations as follows:

$$P_{thresh}[P_{thresh,x} P_{thresh,y} P_{thresh,z} P_{thresh,p} P_{thresh,r}] \quad (10)$$

The selection of $P_{thresh}$ at the k+1th iteration, $P_{thresh,k+1}$, depends on the current z position $z_k$, the number of the detected solution sets $n_{1,k}$ and $n_{2,k}$, and the number of overlaps detected N.

Figure 6:
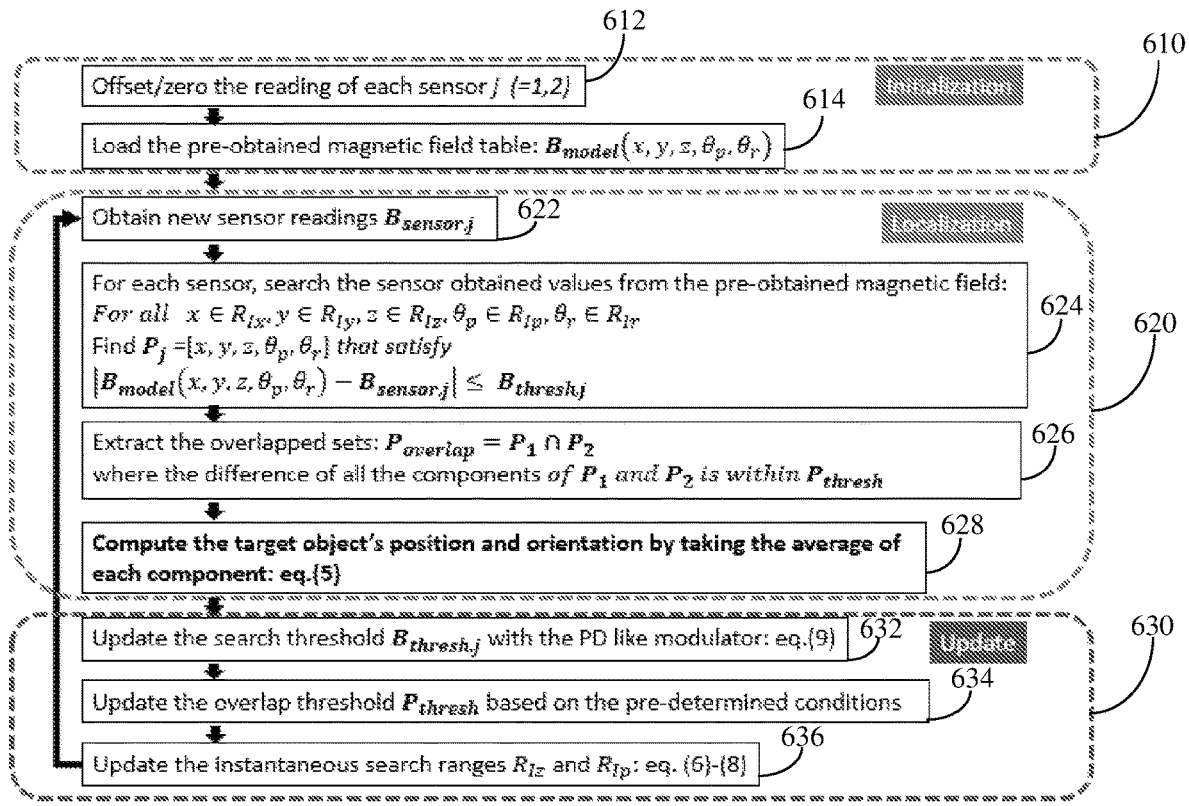
FIG. 6 depicts a flow diagram of a two magnetic sensor-based tracking method in accordance with the present embodiments in accordance with the present embodiments.

All the parameters for both thresholds can be determined experimentally (by trial and error) and the values used are presented hereinafter. To summarize, the overall flow of the two magnetic sensor-based tracking method in accordance with the present embodiments is illustrated in FIG. 6. FIG. 6 depicts a flow diagram 600 including an initialization portion 610, a localization portion 620 and an update portion 630.

Initially, the reading of each sensor 130, 140 is zeroed or offset 612 and the pre-obtained magnetic field table $B_{model}$ (x, y, z, $\theta_p$, $\theta_r$) is loaded 614. In the localization portion 620, new sensor readings, $B_{sensor,j}$, are obtained 622. At step 624, for each sensor 130, 140, search the pre-obtained magnetic field table for the sensor values obtained at step 622. In accordance with the present embodiments, the step 624 would include finding $P_j=[x, y, z, \theta_p, \theta_r]$ that satisfies $|B_{model}(x, y, z, \theta_p, \theta_r) - B_{sensor,j}| \leq B_{thresh,j}$ for all instantaneous search ranges 420 of x, y, z, θp, $\theta_r$. At step 626, overlapped sets of $P_1$ and $P_2$ where the difference of all the components of $P_1$ and $P_2$ are within $P_{thresh}$ are extracted. Then, at step 628 the target object's (i.e., the MIBC 110 with the permanent magnet 220) position and orientation are computed in accordance with Equation (5) by taking the average of each component x, y, z, $\theta_p$, $\theta_r$.

The update portion 630, consisting of steps 632, 634 and 636, updates various parameters before obtaining new sensor readings at step 622. At step 632, the search threshold, $B_{sensor,j}$, is updated in accordance with Equation (9) by the proportional derivative controller search threshold modulator 500. At step 634, the overlap threshold, $P_{thresh}$, is updated based on predetermined conditions. And at step 636, the instantaneous search ranges 420 are updated in accordance with Equations (6) to (8).

Figure 7:
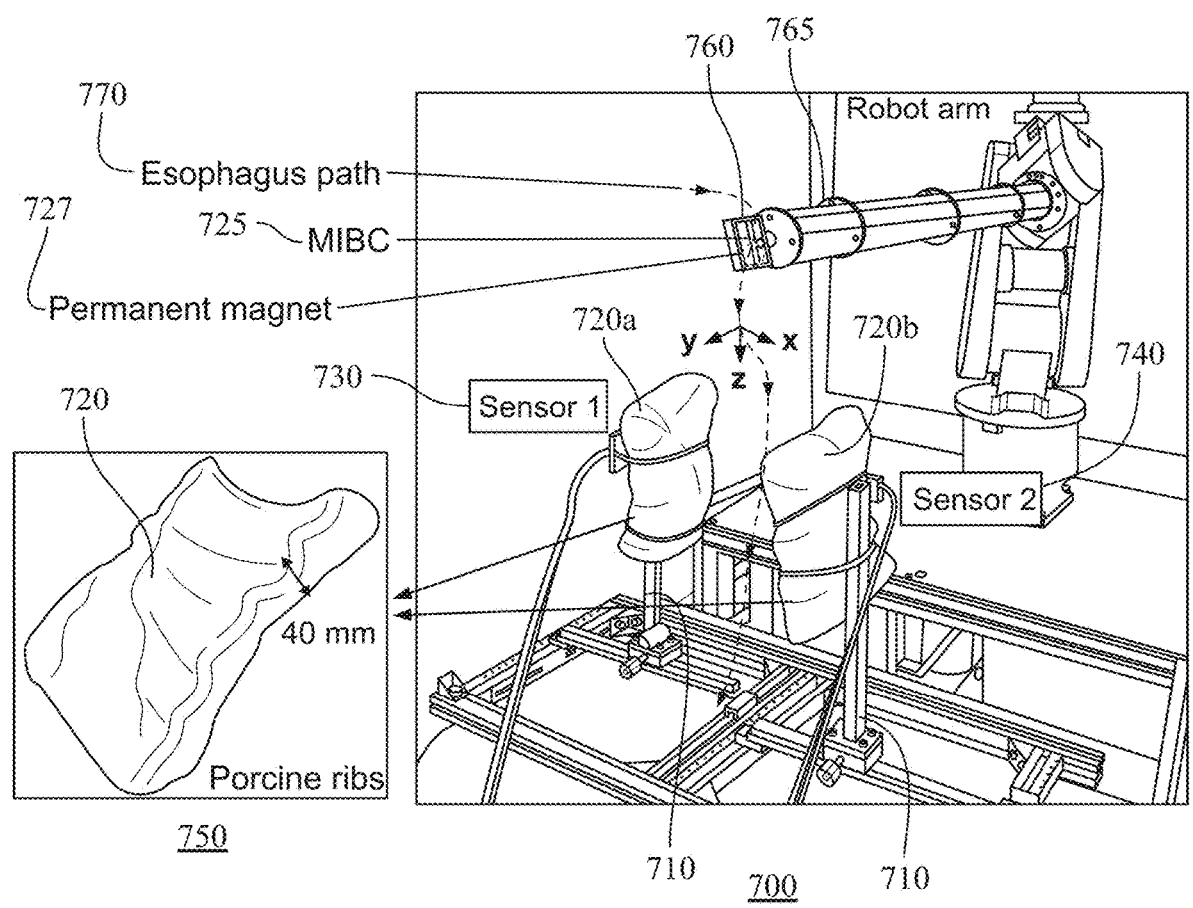
FIG. 7 depicts a photograph of an experimental setup for testing tracking accuracy of the magnetic sensor-based tracking methods and systems in accordance with the present embodiments.

Referring to FIG. 7, a photograph 700 depicts an experimental setup for testing the position tracking accuracy of the two magnetic sensor-based tracking methods and systems in accordance with the present embodiments. Two magnetic sensors 730, 740 were placed 200 mm apart on an aluminium frame 710 and they were covered by porcine ribs 720a, 720b with a 40 mm thickness. One of the porcine ribs 720 having the 40 mm thickness is shown in the photograph 750. The porcine ribs 720a, 720b were placed in front of the sensors 730, 740 to simulate an actual biological environment and a MIBC 725 including a permanent magnet 727 in accordance with the present embodiments was attached at a tip 760 of a robot arm 765. The robot arm 765 was an IRB 120 robot arm from ABB of Switzerland and was programmed to move the attached MIBC 725 in an esophagus-shaped path 770 between the sensors 730, 740.

Although, in theory, the human body would not be expected to distort the magnetic field, the sensors 730, 740 were separated from the MIBC 725 by the porcine ribs 720a, 720b, the porcine ribs 720a, 720b being biological tissue with bones to simulate a condition close to the actual biological environment. The esophagus-shaped path 770 is a trajectory used by the robot and programmed to move the robotic arm 765 based on a trajectory measured by inserting an electromagnetic tracker into a human torso model. However, since the length of esophagus-shaped path 770 is about 200 mm, the measured trajectory was extended to simulate the path through an average adult esophagus and beyond the EG junction 120e (FIG. 1) and into the stomach 150. Also, the y component of the esophagus-shaped path 770 was added for the extended portion of the trajectory as the stomach 150 is normally located on the left side of the body. Although the trajectory starts from the nose, it is still suitable for our experiment since the tracking only starts from the neck.

Figure 8A:
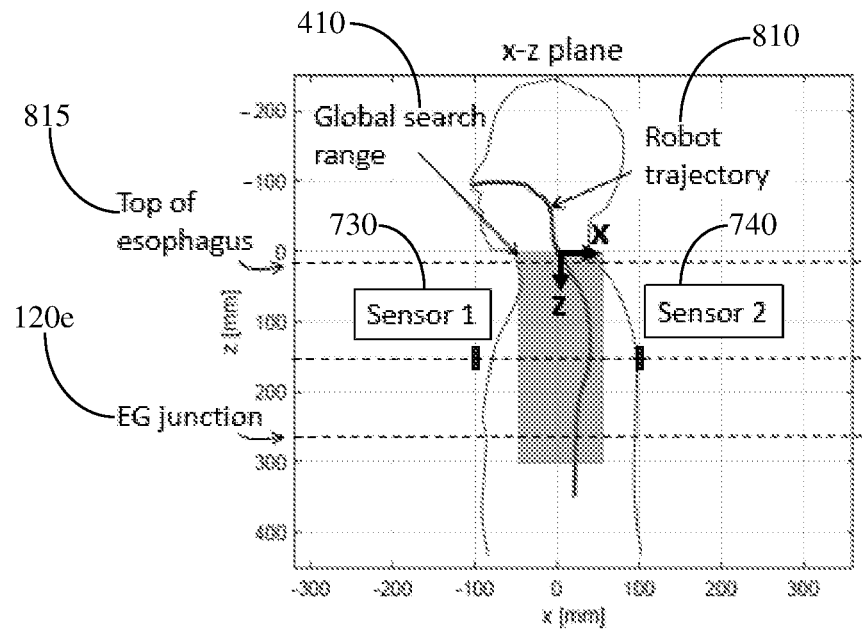
Figure 8B:
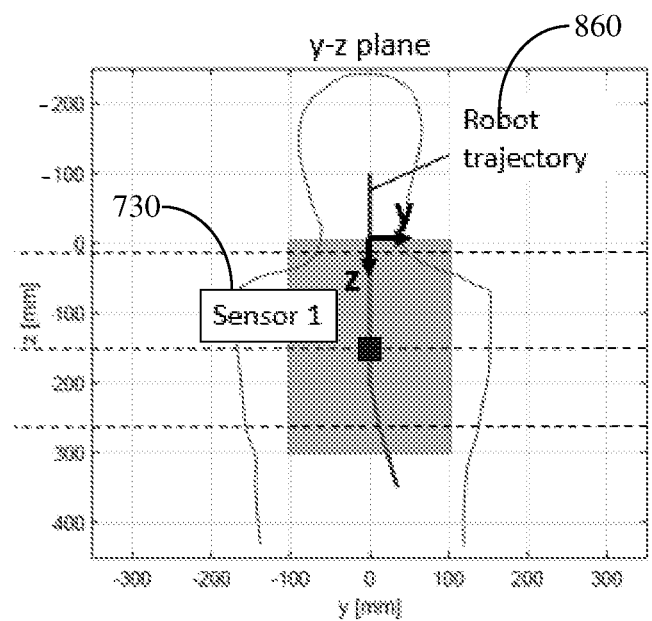

Referring to FIGS. 8A and 8B, graphs 800, 850 depict a front (x-z plane) view and a side (y-z plane) view, respectively, of the obtained robot trajectory 810, 860. It has been shown that the speed of esophageal peristalsis could reach as fast as 50 mm/s in the mid esophagus 120c. Therefore, the robot's speed was set to 50 mm/s. To minimize the effect from the magnetic field generated by the robot arm 765, the robot tip 760 was extended out and the background magnetic field along the trajectory was pre-measured and subtracted from the sensor readings.

The x, y, and z ranges of the pre-calculated magnetic field data $B_{model}$ in the table 614 (FIG. 6) that are used as the global search range 410 are selected such that they encompass the entire esophagus with some margins. With respect to the center of the sensors 730, 740, the x range is pre-calculated from 50 mm to 150 mm, the y range is pre-calculated from −100 mm to 100 mm, and the z range is pre-calculated from −150 mm to 150 mm. In terms of the global frame, $R_{G_x}=[-50, 50]$, $R_{G_y}=[-100, 100]$, $R_{G_z}=[0, 300]$, where $R_{G_z}$ starts from 20 mm above a top of the esophagus 815 and ends 30 mm below the EG junction 120e. Although narrowing the ranges for $R_{G_x}$ and $R_{G_y}$ could reduce the computational burden, it was observed that the tracking became inconsistent for narrower ranges. The entire range of rotation was of interest; therefore, values from 0 to π for pitch and from 0 to $2\pi$ for roll were pre-calculated ($R_{G_p}$=[0, $\pi$] and $R_{G_r}$=[0, $2\pi$]). The increment sizes for all the translations and rotations were set to be 10 mm and $\pi/18$, respectively.

The parameters for the instantaneous search range were determined as follows. The anatomy in the illustration 100 of FIG. 1 and the illustrations 400, 450 of FIGS. 4A and 4B indicates a length of the esophagus 120 is 250 mm. In accordance with the present embodiments, the vertical sensor position was determined to make the global search range 410 cover 20 mm above the top of the esophagus 810 and 30 mm below the end of the esophagus 120e. Therefore, the value $z_{EGJ}$=270 mm was used. For d, a value of 20 mm was arbitrarily selected. Although d could be any value, it was only to define the border between Region 1 454 and Region 2 456 and a slight difference does not significantly affect the overall tracking performance of the methods and systems in accordance with the present embodiments. While the speed of the robot arm 765 was set to be 50 mm/s for the experiment, $v_{max}$=100 mm/s was used to ensure the speed of the MIBC 725 as maintained below $v_{max}$. The maximum tilt angle of the esophagus $\theta_{p,max}$ was set to be $\pi/6$ since the maximum tilt angle in the tested trajectory was about $\pi/9$. For pitch rotation boundaries, $\phi_{R1}$=$\pi/18$ and $\phi_{R2}$=9 were used. Also, for the uncertainties, $z_{unc}$=10 mm and $\theta_{p,unc}$=$\pi/18$ were selected considering the increment sizes of the pre-calculated magnetic field.

Figure 9:
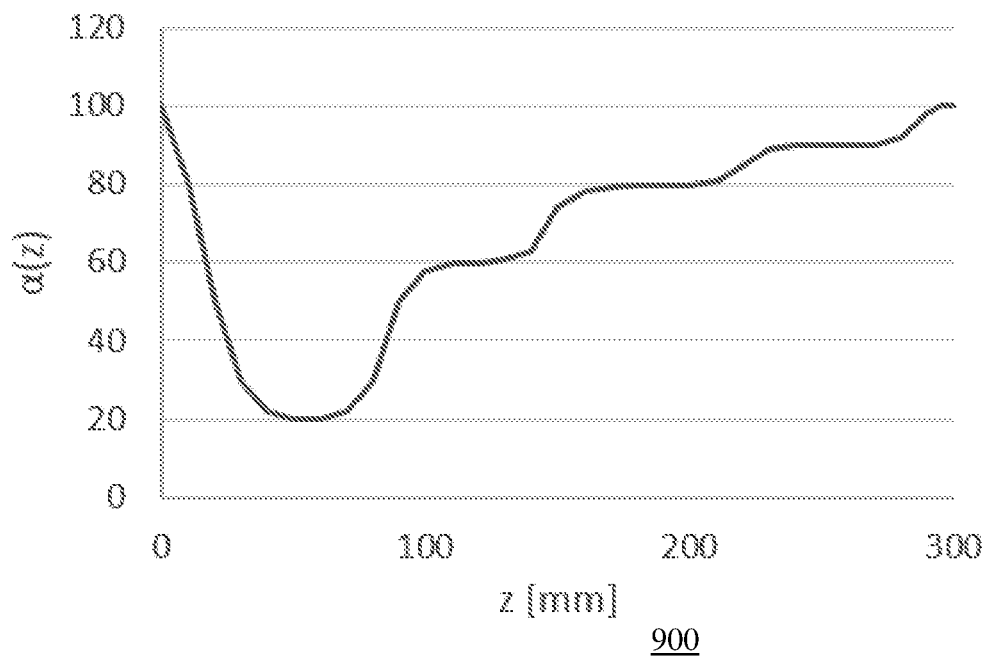
FIG. 9 depicts a graph of $\alpha(z)$ used for the proportional derivative modulator of Equation (9) in accordance with the present embodiments.

For the proportional derivative modulator of Equation (9), $\alpha(z)$ and $\beta$ were determined by trial and error by manually adjusting the values until $n_j$ became stable. For both sensors, the value of $\beta$ was set to 0.01 and the value of $\alpha(z)$ was variable over height z within the esophagus as plotted in a graph 900 in FIG. 9. Finally, to balance the computational time and the tracking accuracy, $n_{target}$, was selected to be 200.

The selection of each component of $P_{thresh}$ is based on the conditions summarized in TABLE 1 below. All the conditions were determined by trial and error. We select the value of $P_{thresh}$ is selected such that N falls between 100 and 500 to achieve real-time tracking. It was experimentally determined that the tracking is stabilized when the threshold for the roll angle is two times higher than that of the other components. The conditions toward the top of TABLE 1 are prioritized when multiple conditions are met.

TABLE 1

| Condition | $P_{thresh, x}$, $P_{thresh, y}$, $P_{thresh, z}$, $P_{thresh, p}$ | $P_{thresh, r}$ |
| --- | --- | --- |
| 0 mm ≤ $z_{est}$ < 25 mm | 0.5 | 1 |
| 285 mm < $z_{est}$ ≤ 300 mm | 0.5 | 1 |
| $n_1$ or $n_2$ < 100 | 1.25 | 2.5 |
| $n_1$ and $n_2$ < 500 | 1 | 2 |
| 500 < N | 0.5 | 1 |
| 100 < N ≤ 500 | 0.75 | 1.5 |
| 0 < N ≤ 100 | 1 | 2 |
| N = 0 | 1.25 | 2.5 |

Figure 10A:
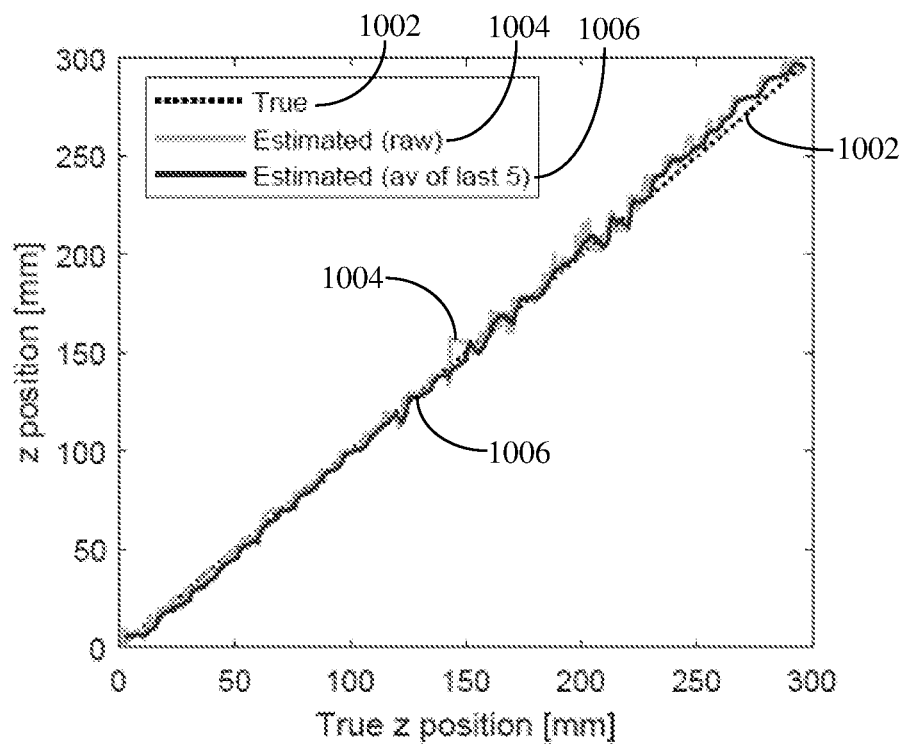

The real-time z position tracking result of the magnetic sensor-based tracking system in accordance with the present embodiments along the esophagus trajectory is shown in a graph 1000 in FIG. 10A. The plot 1002 indicates the centroid position of the magnet embedded inside the MIBC. While the raw estimated z position 1004 follows the trend of the true position 1002, the estimation 1004 frequently deviates from the true value 1002. To eliminate the frequent deviation, an average of the last five estimations 1006 is computed for every estimation data point and also plotted in the graph 1000.

Figure 10B:
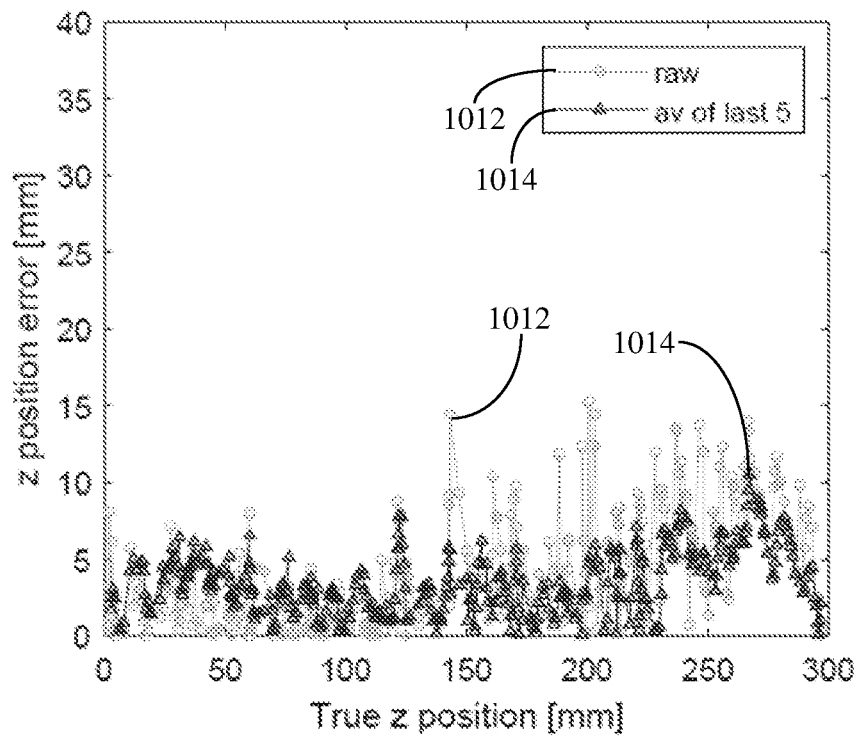

For the first four estimations, the average of the maximum number of the estimations available is used. Compared to the raw estimation result 1012, the overall estimation error as indicated by the average of the previous five position error estimations 1014 becomes smaller as shown in a graph 1010 in FIG. 10B. The mean absolute error was improved from 4.16 mm to 3.48 mm. In the experimental setup, the tracking beyond 270 mm was considered inside the stomach 150. Even with the 3.48 mm error, the MIBC 110 would be inside the stomach 150 as long as the estimated z position is beyond 273.48 mm. Therefore, the 3.48 mm z tracking error should be sufficiently small for clinical applications.

Figure 10C:
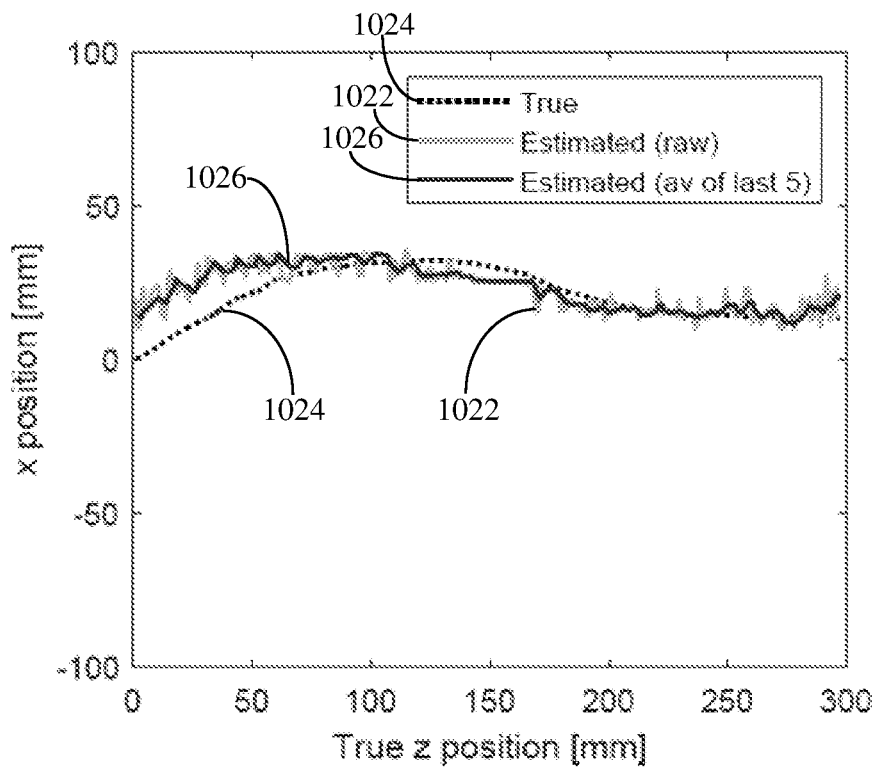
Figure 10D:
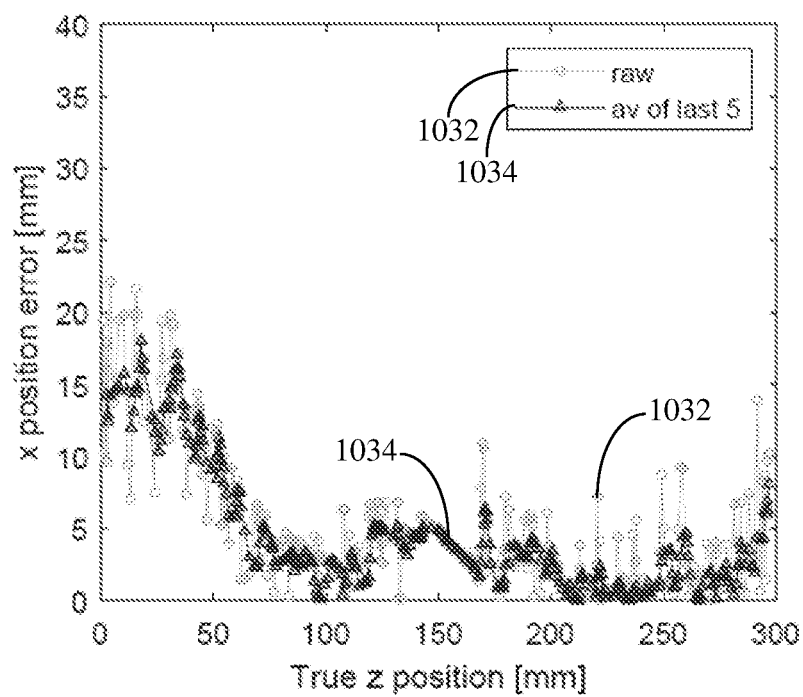
Figure 10E:
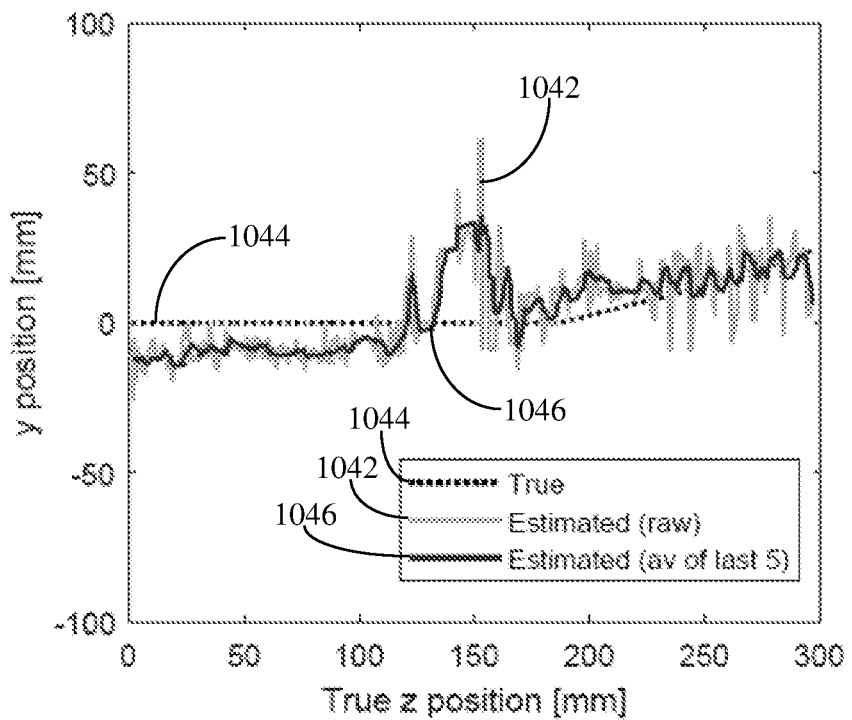
Figure 10F:
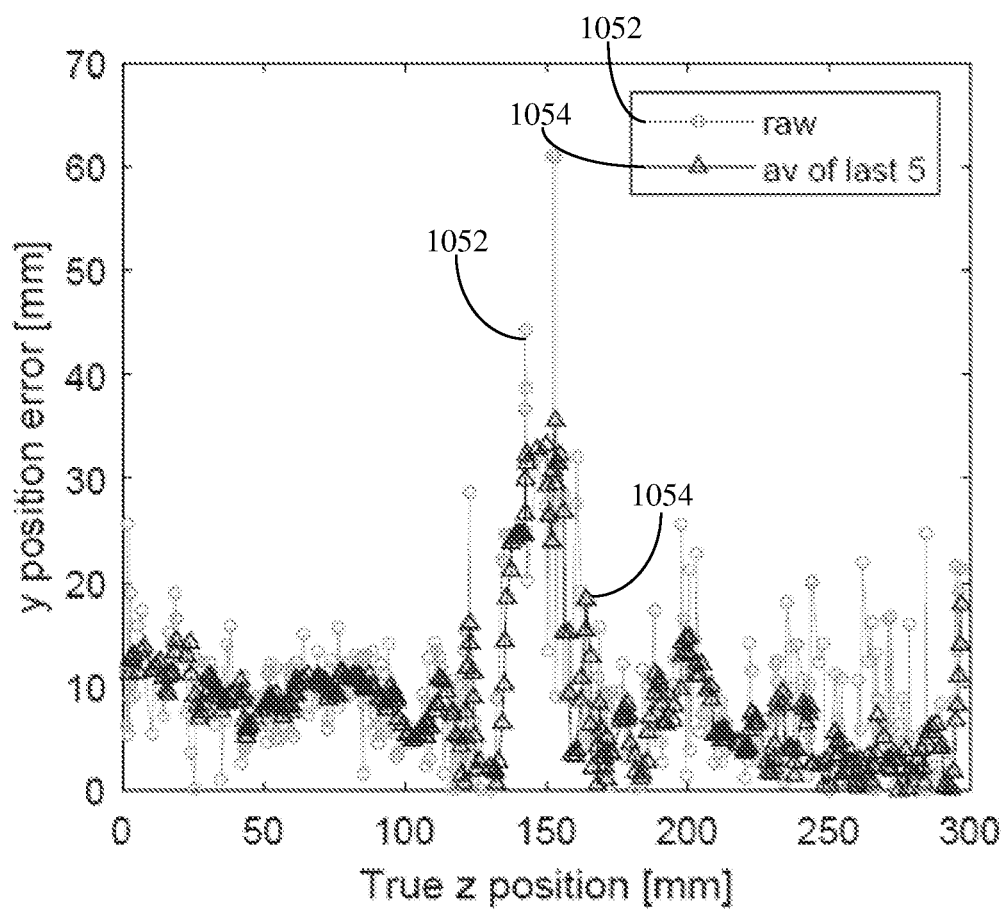

Besides z position tracking, x and y position tracking performances are investigated to evaluate the tracking capability of the presented method. The raw estimation results 1022, the true values 1024, and the average of the last five estimations 1026 for x and the raw estimation results 1042, the true values 1044, and the average of the last five estimations 1046 for y are plotted in graphs 1020 (FIG. 10C) and 1040 (FIG. E), respectively. Also, the raw estimation results 1032 and the average of the previous five position error estimations 1034 for x and the raw estimation results 1052 and the average of the previous five position error estimations 1054 for estimation errors are plotted in graphs 1030 (FIG. 10D) and 1050 (FIG. F), respectively. The mean absolute error of the raw estimation data 1022, 1042 was obtained as 5.20 mm and 10.12 mm for the x-axis and y-axis, respectively. After taking the average of the last five estimations 1026, 1046, the mean absolute error was reduced to 4.49 mm and 8.54 mm. The mean absolute errors of the raw estimation result and the average of the last five estimations for each axis are summarized in TABLE 2.

TABLE 2

|   | MAE (raw estimation) [mm] | MAE (avg. of last 5 estimations) [mm] |
| --- | --- | --- |
| z | 4.16 | 3.48 |
| x | 5.20 | 4.49 |
| y | 10.12 | 8.54 |

Using a laptop PC with an Intel i7-7500U 2.7 GHz CPU, the system achieved a tracking frequency of between 50 and 70 Hz. Therefore, the PC could be downgraded for cost reduction while still achieving real-time magnetic field-based tracking in accordance with the methods and systems of the present embodiments. Although the applicability of the methods and systems in accordance with the present embodiments for magnetic field-based MIBC tracking have been shown experimentally herein, the parameters presented hereinabove provide a method and system limited to patients with a chest thickness at the upper pulmonary rib cage (i.e., between the upper thoracic esophagus 120b and the middle thoracic esophagus 120c (FIG. 1)) of less than 200 mm. Also, the experimental setup and experimental parameters presented herein able to cover the entire esophagus vertically only when the length is shorter than 250 mm. However, those skilled in the art will realize that application to different chest thicknesses and longer-range tracking could be realized in accordance with the methods and systems of the present embodiments by employing higher resolution magnetic sensors 130, 140.

Also, while the search threshold $B_{thresh_j}$ is independent or negligibly dependent on the changes in x and y in the experimental results herein, this could be because the trajectory's z motion range is large while the x and y motion ranges are small. For other applications where the x and y movement or orientation change is significant, the proportional derivative modulator in accordance with the methods and systems of the present embodiments may need to be dependent on those variables.

Further, for the experimental setup discussed hereinabove, it is assumed that the subject is in an upright position when swallowing the MIBC 110 and the conditions for the instantaneous search range 420 are adjusted for the upright position. However, the algorithm in accordance with the methods and systems of the present embodiments is not limited by the position of the patient. If the patient is in a supine position, the tracking will be simpler as the speeding of the MIBC 110 due to gravity will disappear in the z-direction in Region 2 456.

The magnetic field-based tracking system in accordance with the methods and systems of the present embodiments is compared to other magnetic sensor-based tracking systems that employ a similar magnet size in TABLE 3. Since the tracking accuracy is largely dependent on the number of sensors, the size of the permanent magnet, and the tracking volume, an average error is also included for each entry in TABLE 3. Although the methods and systems in accordance with the present embodiments achieved relatively low accuracy, the mean absolute error of 3.48 mm is sufficient for confirming the MIBC 110 is no longer inside the esophagus 120 as discussed hereinabove. The methods and systems in accordance with the present embodiments advantageously present a simple solution for magnetic field-based tracking within a biological environment by enabling the capability of real-time tracking of a permanent magnet 220 in the biological environment using only two magnetic sensors 130, 140.

TABLE 3

|  | # of sensors | Volume [mm] | Magnet [mm] | Avg. error in 1D [mm] |
| --- | --- | --- | --- | --- |
| Present Embodiment | 2 | 200 × 300 × 200 | Ring OD8 × ID3 × L3 | 3.48 |
| 1$^{st}$ Prior Art | 64 | 500 × 500 × 500 | Cylinder Φ5 × L6 | 0.53-1.57 |
| 2$^{nd}$ Prior Art | 9 | 500 × 500 × 200 | Cylinder Φ8 × L3 | 2.72-3.94 |
| 3$^{rd}$ Prior Art | 4 | 200 × 200 × 200 | Cylinder Φ6 × L12 | (5 in 3D) |

The experimental results indicate a position accuracy in the y-axis about twice lower than that of the z and x-axis. To improve the y tracking accuracy and achieve more accurate three-dimensional position tracking, an additional sensor could be introduced into the sensor arrangement for optimal three-dimensional tracking accuracy in accordance with the methods and systems of the present embodiments.

Thus, it can be seen that the present embodiments provide a simpler, less complex, cheaper method and system for magnetic field-based tracking in an environment such as a biological environment. In accordance with the present embodiments, methods and systems for two magnetic sensor-based localization of a MIBC 110 with a permanent magnet embedded inside. Safe inflation of the MIBC 110 can be achieved in accordance with the methods and systems of the present embodiments by tracking the z position of the MIBC 110 along the esophagus 120 and confirming the MIBC 110 is no longer inside the esophagus 120. The location of the permanent magnet 220 is estimated by searching the sensor obtained values from the pre-calculated table of the permanent magnet's magnetic field. Accurate and robust tracking is achieved in accordance with the methods and systems of the present embodiments through advantageous use of a dynamically adjusted search range obtained from the anatomical and physical boundaries of the esophagus 120. In addition, a proportional derivative controller-like modulator beneficially controls the search threshold in accordance with the present embodiments.

The tracking accuracy of the methods and systems in accordance with the present embodiments was evaluated using a setup (FIG. 7) that simulates the swallowing process of the MIBC in a biological environment. The accuracy achieved indicates that the methods and systems in accordance with the present embodiments can be used for real-time tracking of the MIBC 110 inside the esophagus 120 and achieve safe inflation of the MIBC 110 in the stomach 150.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A magnetic sensor-based tracking system for tracking an apparatus through an environment having a consistent magnetic field, the magnetic sensor-based tracking system comprising:

the apparatus comprising a magnetic field generating device;

one or more magnetic field sensing devices, wherein each of the one or more magnetic field sensing devices is configured in operation to be located within a sensible range of an expected path of the magnetic field generating device as it passes through the environment, the expected path comprising a plurality of regions; and a controller coupled to each of the one or more magnetic field sensing devices, the controller configured in operation to utilize magnetic field sensing of the one or more magnetic field sensing devices to track the apparatus within the environment by:

obtaining a first magnetic field reading from a first magnetic field sensing device and a second magnetic field reading from a second magnetic field sensing device;

searching the first magnetic field reading and the second magnetic field reading in an instantaneous search range of a pre-obtained magnetic field model to obtain a first solution set and a second solution set respectively that are within a search threshold;

extracting overlapped solution sets comprising a difference of all components of the first solution set and the second solution set, wherein the difference of all components is within an overlap threshold;

computing a position and an orientation of the apparatus within the environment based on the at least one average of each component of all overlapped solution sets; and updating the search threshold, the overlap threshold, and the instantaneous search range for subsequent searches by the controller, based on one or both of a required usage of the magnetic sensor-based tracking system or the environment through which the apparatus is tracked.

2. The magnetic sensor-based tracking system in accordance with claim 1 wherein the magnetic field generating device is a permanent magnet.

3. The magnetic sensor-based tracking system in accordance with claim 1 wherein the magnetic field generating device is an electromagnet.

4. The magnetic sensor-based tracking system in accordance with claim 1 wherein the environment is a biological environment.

5. The magnetic sensor-based tracking system in accordance with claim 4 wherein the biological environment is an in vivo environment of a human or animal and the in vivo environment includes an esophageal track.

6. The magnetic sensor-based tracking system in accordance with claim 1 wherein the apparatus is a magnetically inflated intragastric balloon capsule (MIBC).

7. The magnetic sensor-based tracking system in accordance with claim 1 wherein a global search range comprises all possible positions and orientations of the apparatus within the plurality of regions, and wherein the controller is further configured in operation to define the instantaneous search range to be a predetermined sub-region of the global search range based on the environment and/or the required usage of the magnetic sensor-based tracking system.

8. The magnetic sensor-based tracking system in accordance with claim 1 wherein the controller is further configured in operation to compute the position and the orientation of the apparatus by determining one or more of coordinates for locating the apparatus in a three-dimensional space, a pitch rotation of the apparatus, or a roll rotation of the apparatus.

9. The magnetic sensor-based tracking system in accordance with claim 8 wherein the coordinates for locating the apparatus in the three-dimensional space comprise three Cartesian coordinates.

10. The magnetic sensor-based tracking system in accordance with claim 1 wherein the first and second magnetic field sensing devices are configured in operation to be arranged in relation to the expected path of the magnetic field generating device as it passes through the environment to facilitate tracking the apparatus based on magnetic field sensing of the first magnetic field sensing device and the second magnetic field sensing device.

11. A method for tracking a magnetic object comprising:
obtaining a first magnetic field reading from a first magnetic field sensor and a second magnetic field reading from a second magnetic field sensor;
searching the first magnetic field reading and the second magnetic field reading in an instantaneous search range of a pre-obtained magnetic field model to obtain a first solution set and a second solution set respectively that are within a search threshold;
extracting overlapped solution sets comprising a difference of all components of the first solution set and the second solution set, wherein the difference of all components is within an overlap threshold;
computing a position and an orientation of the magnetic object based on an average of each component of all overlapped solution sets; and
updating the search threshold, the overlap threshold, and the instantaneous search range for subsequent searches based on one or both of a required usage of the method for tracking or an environment through which the magnetic object is tracked.

12. The method in accordance with claim 11 wherein obtaining the first and second magnetic field reading comprises applying predetermined constant offsets to remove background magnetic field before obtaining the first and second magnetic field reading.

13. The method in accordance with claim 11 wherein searching the first and second magnetic field reading in the instantaneous search range of the pre-obtained magnetic field model comprises searching the first and second magnetic field reading within predetermined sub-regions of a global search range to obtain the solution sets that are within the search threshold, wherein the global search range includes all possible positions and orientations of the magnetic object.

14. The method in accordance with claim 13 wherein the predetermined sub-regions of the global search range are based on one or both of a required usage of the method for tracking or an environment through which the magnetic object is tracked.

15. The method in accordance with claim 11 wherein the search threshold comprises an acceptable error between the pre-obtained magnetic field model and the first and second magnetic field reading.

16. The method in accordance with claim 11 wherein searching the first and second magnetic field reading in the instantaneous search range of the pre-obtained magnetic field model comprises determining one or more of coordinates for locating the magnetic object in a three-dimensional space, a pitch rotation of the magnetic object, or a roll rotation of the magnetic object.

17. The method in accordance with claim 16 wherein the coordinates for locating the magnetic object in the three-dimensional space comprise three Cartesian coordinates.

18. A non-transitory computer readable media for tracking a magnetic object utilizing magnetic field sensing of one or more magnetic field sensing devices, the computer readable medium storing instructions for a processing means to:
obtain a first magnetic field reading from a first magnetic field sensing device and a second magnetic field reading from a second magnetic field sensing device;
search the first magnetic field reading and the second magnetic field reading in an instantaneous search range of a pre-obtained magnetic field model to obtain a first solution set and a second solution set respectively that are within a search threshold;
extract overlapped solution sets comprising a difference of all components of the first solution set and the second solution set, wherein the difference of all components is within an overlap threshold;
compute a position and an orientation of the magnetic object based on an average of each component of the overlapped solution sets; and
update the search threshold, the overlap threshold, and the instantaneous search range for subsequent searches based on one or both of a required usage of the method for tracking the magnetic object or an environment through which the magnetic object is tracked.

* * * * *